US 8,050,680 B2

(12) United States Patent
Won et al.

(10) Patent No.: US 8,050,680 B2
(45) Date of Patent: Nov. 1, 2011

(54) APPARATUS AND METHOD FOR PERFORMING VERTICAL HANDOVER IN A WIRELESS COMMUNICATION SYSTEM

(75) Inventors: Jeong-Jae Won, Hwaseong-si (KR); Eui-Seok Hwang, Hwaseong-si (KR); Young-Seok Kim, Seongnam-si (KR); Young-Don Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 12/286,596

(22) Filed: Oct. 1, 2008

(65) Prior Publication Data

US 2009/0088163 A1    Apr. 2, 2009

(30) Foreign Application Priority Data

Oct. 2, 2007 (KR) .................. 10-2007-0099371

(51) Int. Cl.
*H04W 36/00* (2009.01)

(52) U.S. Cl. ........ 455/436; 455/437; 455/438; 455/439; 455/442; 455/432.1; 455/435.2; 370/331; 370/332

(58) Field of Classification Search .................. 455/436, 455/464; 370/331, 332
See application file for complete search history.

(56) References Cited

U.S. PATENT DOCUMENTS

| | | | | |
|---|---|---|---|---|
| 7,796,553 | B2 * | 9/2010 | Lee | 370/331 |
| 2008/0064402 | A1 * | 3/2008 | Oh | 455/436 |
| 2008/0080426 | A1 * | 4/2008 | Kim et al. | 370/331 |
| 2008/0101300 | A1 * | 5/2008 | Oh | 370/332 |
| 2008/0273500 | A1 * | 11/2008 | Suh et al. | 370/331 |

FOREIGN PATENT DOCUMENTS

KR    10-2007-0025964    3/2007

OTHER PUBLICATIONS

Office Action dated Oct. 18, 2010 in connection with Korean Patent Application No. 10-2007-0099371.

* cited by examiner

*Primary Examiner* — David Q Nguyen

(57) ABSTRACT

A vertical handover method and apparatus in a wireless communication system are provided, in which a serving network selects a target network for a vertical handover of a terminal from among at least one candidate target network to which the terminal can perform the vertical handover, transmits information about the selected target network to the terminal, and requests the vertical handover of the terminal to the target network, the target network acquires a profile of the terminal from a policy store, upon receipt of the vertical handover request from the serving network, the terminal requests a connection to the target network, and the target network transmits information about a router to which the terminal will connect to the terminal, upon receipt of the connection request from the terminal and updates a proxy binding for the terminal in the policy store.

11 Claims, 5 Drawing Sheets

APPARATUS AND METHOD FOR PERFORMING VERTICAL HANDOVER IN A WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Oct. 2, 2007 and assigned Serial No. 2007-99371, the entire disclosure of which is hereby incorporated by reference.

TECHNICAL FIELD OF THE INVENTION

The present invention generally relates to an apparatus and method for performing vertical handover in a wireless communication system supporting multiple networks. More particularly, the present invention relates to an apparatus and method for performing vertical handover by Proxy Mobile IPv6-based Media Independent Handover (MIH) in a wireless communication system.

BACKGROUND OF THE INVENTION

Along with the ever-increasing demands for multimedia service, studies have recently been conducted on communication technologies for increasing data rate in wireless communication systems. For example, the communication technologies include Institute of Electrical and Electronics Engineers (IEEE) 802.11 Wireless Local Area Network (WLAN) and IEEE 802.16 Wireless Metropolitan Area Network (WMAN).

WLAN, an extension of wired LAN based on IEEE 802.11, is a short-range communication technology developed to provide high-speed communication services to stationary users in a limited crowded area such as outdoors or downtown. A network supporting the WLAN technology (referred to as a WLAN network) supports data rates ranging from tens of Mbps to hundreds of Mbps to users within a service area. However, the WLAN network does not ensure mobility to users and covers a limited service area.

WMAN provides data service to users that are stationary, walk, and move at a medium speed of up to 60 km/h according to IEEE 802.16. A network supporting the WMAN technology (referred to as a WMAN network) supports average data rates of tens of Mbps. The WLMAN network ensures mobility to users and covers a wide service area.

As described above, in the case where a wireless communication system supports multiple networks owing to the development of communication technology, the networks have different characteristics.

Therefore, for the wireless communication system to select a network according to the type of a user-requested service and provide it to users, the networks should interwork reliably. That is, the wireless communication system should support seamless handover between heterogeneous networks or media.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for performing vertical handover by an MIH technology in a wireless communication system supporting multiple networks.

Another aspect of exemplary embodiments of the present invention provides an apparatus and method for performing vertical handover by a Proxy Mobile IPv6-based MIH technology in a wireless communication system supporting multiple networks.

A further aspect of exemplary embodiments of the present invention provides an apparatus and method for performing fast vertical handover by a Proxy Mobile IPv6-based MIH technology in a wireless communication system supporting multiple networks.

In accordance with an aspect of exemplary embodiments of the present invention, there is provided a vertical handover method in a wireless communication system, in which a serving network selects a target network for a vertical handover of a terminal from among at least one candidate target network to which the terminal can perform the vertical handover, transmits information about the selected target network to the terminal, and requests the vertical handover of the terminal to the target network, the target network acquires a profile of the terminal from a policy store, upon receipt of the vertical handover request from the serving network, the terminal requests a connection to the target network, and the target network transmits information about a router to which the terminal will connect to the terminal, upon receipt of the connection request from the terminal and updates a proxy binding for the terminal in the policy store.

In accordance with another aspect of exemplary embodiments of the present invention, there is provided a vertical handover method in a wireless communication system, in which a terminal selects a target network for a vertical handover from among at least one candidate target network according to whether the at least one candidate target network supports the vertical handover and transmits information about the selected target network to a serving network, the serving network requests the vertical handover of the terminal to the target network, the target network acquires a profile of the terminal from a policy store, upon receipt of the vertical handover request from the serving network, the terminal requests a connection to the target network, the target network transmits information about a router to which the terminal will connect to the terminal, when receiving the connection request from the terminal, and the target network updates a proxy binding for the terminal in the policy store.

In accordance with a third aspect of exemplary embodiments of the present invention, there is provided a wireless communication system for performing a vertical handover, in which a serving network selects a target network for a vertical handover of a terminal from among at least one candidate target network to which the terminal can perform the vertical handover and requests the vertical handover of the terminal to the target network, and the target network acquires a profile of the terminal from a policy store, upon receipt of the vertical handover request from the serving network, transmits information about a router to which the terminal will connect to the terminal, upon receipt of a connection request from the terminal, and updates a proxy binding for the terminal in the policy store.

In accordance with a fourth aspect of exemplary embodiments of the present invention, there is provided a wireless communication system for performing a vertical handover, in which a terminal selects a target network for a vertical handover from among at least one candidate target network according to whether the at least one candidate target network supports the vertical handover, the serving network requests the vertical handover of the terminal to the target network, upon receipt of a handover request signal from the terminal, and the target network acquires a profile of the terminal from a policy store by the target network, upon receipt of the vertical handover request from the serving network, transmits information about a router to which the terminal will connect to the terminal, upon receipt of a connection request from the terminal, and updates a proxy binding for the terminal in the policy store.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention is intended to provide a vertical handover technique in a wireless communication system supporting multiple networks.

The following description is made of a technique for performing a vertical handover by Proxy Mobile IPv6-based MIH in a wireless communication system. The MIH is a standard for heterogeneous handover developed by the IEEE 802.21 working group.

The MIH technology enables a terminal to perform seamless handover between heterogeneous networks or media in a wireless communication system supporting multiple networks by providing Event Service, Command Service, and Information Service.

For vertical handover in a wireless communication system, a terminal should have multiple wireless interfaces to support multiple networks. Hereinbelow, it is assumed that the wireless communication system supports two networks, and thus the terminal includes two wireless interfaces. If the wireless communication system supports three or more networks, the terminal can have three or more wireless interfaces.

Figure 1:
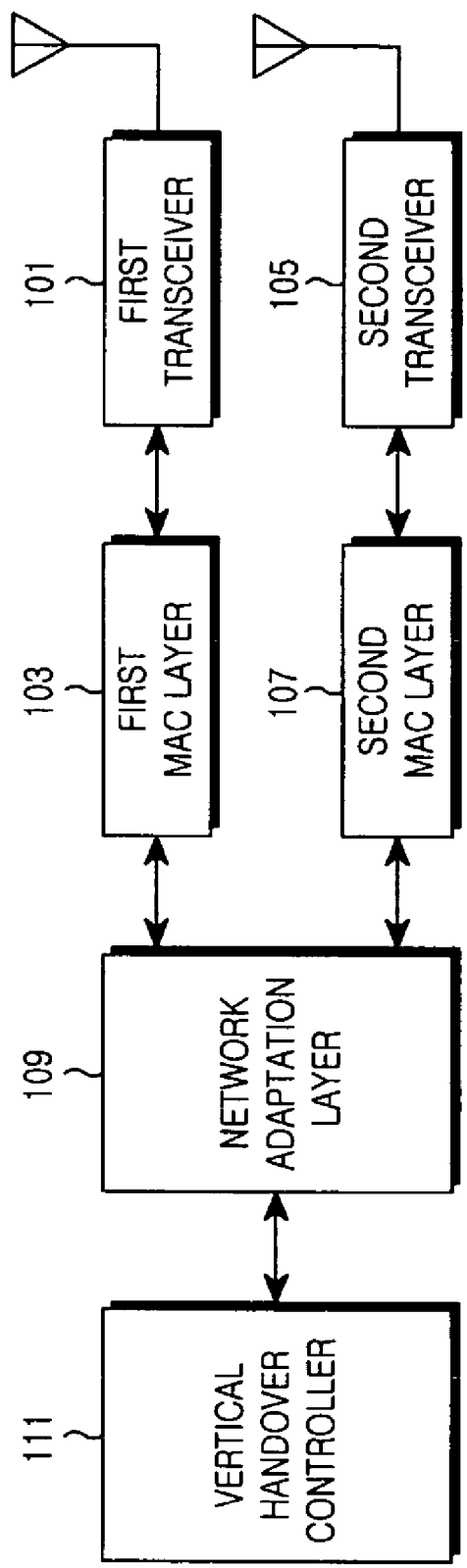
FIG. 1 is a block diagram of a terminal for performing a vertical handover in a wireless communication system according to the present invention.

FIG. 1 is a block diagram of a terminal for performing a vertical handover in a wireless communication system according to the present invention.

Referring to FIG. 1, the terminal includes a first transceiver 101, a first Media Access Control (MAC) layer 103, a second transceiver 105, a second MAC layer 107, a network adaptation layer 109, and a vertical handover controller 111.

The first transceiver 101 processes a radio frequency (RF) signal received over a first network (e.g., a WLAN network) being one of multiple networks supported by the wireless communication system. The first MAC layer 103 processes baseband signals transmitted and received through the first transceiver 101.

The second transceiver 105 processes an RF signal received over a second network (e.g., a broadband mobile communication network) being one of multiple networks supported by the wireless communication system. The second MAC layer 107 processes baseband signals transmitted and received through the second transceiver 105.

There are media dependent service access points between the network adaptation layer 109 and the MAC layers 103 and 107. The media dependent service access points use signals defined according to MAC types. For example, the media dependent service access point between the first MAC layer 103 and the network adaptation layer 109 uses signals of a type defined for an IEEE 802.11 MAC LayerManagement Entity-ServiceAccess Point (MLME-SAP). Signals of a type defined in IEEE 802.16g C_SAP Primitives are used between the second MAC layer 107 and the network adaptation layer 109.

Therefore, the network adaptation layer 109 converts signals of different types received from the MAC layers 103 and 107 to signals that the vertical handover controller 111 can receive regardless of the MAC types.

The network adaptation layer 109 also converts a signal received from the vertical handover controller 111 according to a MAC type and provides the converted signal to the MAC layer 103 or 107.

The vertical handover controller 111 controls vertical handover of the terminal according to the signal received from the network adaptation layer 109.

Now a description will be made of a procedure for performing a vertical handover by the Proxy Mobile Ipv6-based MIH technology in the wireless communication system. This procedure will be described separately as a target network selection procedure and a procedure for a vertical handover to a target network.

A procedure for controlling the start of a handover by a serving network in the wireless communication system will first be described.

Figure 2:
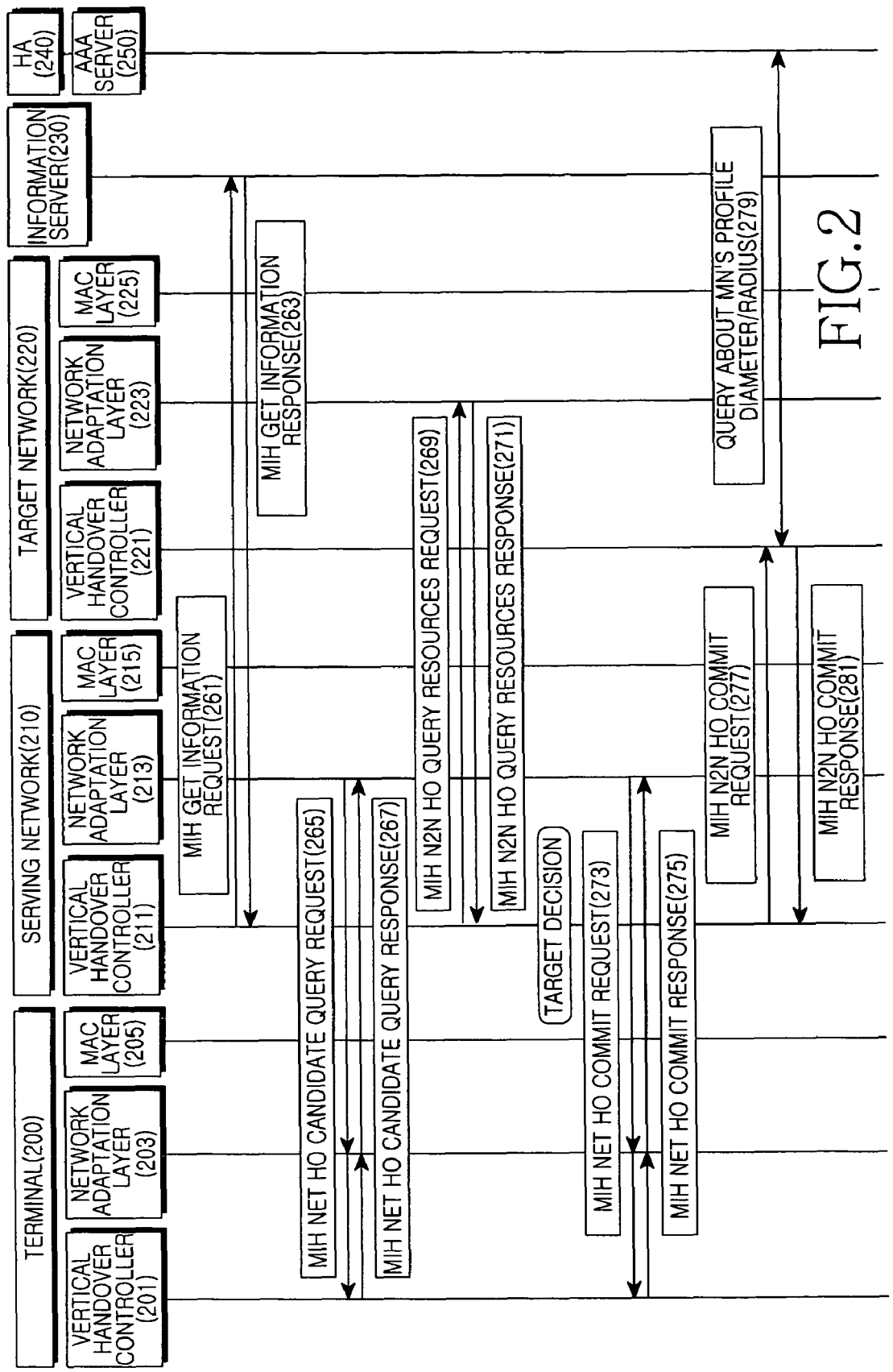
FIG. 2 is a diagram illustrating a signal flow for a procedure for selecting a target network for a vertical handover in a wireless communication system according to an exemplary embodiment of the present invention.

FIG. 2 is a diagram illustrating a signal flow for a procedure for selecting a target network for a vertical handover in a wireless communication system according to an exemplary embodiment of the present invention.

Referring to FIG. 2, a terminal 200 receives a service over a serving network 210. The serving network 210 acquires information about neighbor networks of the terminal 200 from an information server 230 through a vertical handover controller 211 of the serving network 210 in steps 261 and 263. For instance, the vertical handover controller 211 of the serving network 210 transmits an MIH Get Information Request message to the information server 230 in order to acquire the neighbor network information in step 261. The information server 230 replies to the vertical handover controller 211 with an MIH Get Information Response message in step 263.

The serving network 210 transmits the neighbor network information received from the information server 230 to a vertical handover controller 201 of the terminal 200 via a vertical handover controller of the terminal 200 by an MIH Net HO Candidate Query Request message in step 265. At the same time, the serving network 210 requests the terminal 200 to select candidate target networks for a vertical handover from among the neighbor networks.

The vertical handover controller 201 of the terminal 200 checks the neighbor network information and selects candidate target networks. Then the vertical handover controller 201 transmits information about the candidate target networks to a network adaptation layer 213 of the serving network 210 via a network adaptation layer 203 by an MIH Net HO Candidate Query Response message in step 267.

The serving network 210 checks the candidate target networks selected by the terminal 200.

In step 269, the serving network 210 queries the candidate target networks whether they can support the vertical handover of the terminal 200 through the vertical handover controller 211. That is, the serving network 210 transmits MIH N2N HO Query Resources Request messages to the candidate target networks in order to determine whether they have resources to support the vertical handover of the terminal 200.

Upon receipt of the MIH N2N HO Query Resources Request messages, the candidate target networks determine whether they can provide a service to the terminal 200 after the vertical handover by checking their available resources.

The candidate target networks transmit MIH N2N HO Query Resources Response messages indicating whether they support the vertical handover to the serving network 210 in step 271.

The serving network 210 selects a target network 220 according to the MIH N2N HO Query Resources Response messages and then transmits an MIH Net HO Commit Request message including information about the target network 220 to the terminal 200 via the network adaptation layer 213 in step 273.

The network adaptation layer 203 transmits the MIH Net HO Commit Request message to the vertical handover controller 201 in the terminal 200.

After identifying the target network 220 in the MIH Net HO Commit Request message, the vertical handover controller 201 transmits an MIH Net HO Commit Response message to the serving network 210 through the network adaptation layer 203 in step 275.

The serving network 210 transmits an MIH N2N HO Commit Request message to the target network 220 through the vertical handover controller 211 in step 277.

Upon receipt of the MIH N2N HO Commit Request message, the target network 220 acquires a profile of the terminal 200 from a policy store 250 of a Home Agent (HA) 240 in step 279. It is assumed herein that the policy store 220 is an Authentication, Authorization and Accounting (AAA) server. The profile of the terminal 200 includes a home agent address of the terminal 200, a home prefix of the terminal 200, an addressing model, a permitted address configuration mechanism, and parameters required for emulating a home network of the terminal 200.

When acquiring the profile of the terminal 200 from the AAA server 250, the target network 220 transmits an MIH N2N HO Commit Response message to the serving network 210 through a vertical handover controller 221 in step 281. Herein, a MAC layer 215 of the serving BS 210 transmits and receives a signal with a terminal which uses communication scheme of the serving BS 210. A MAC layer 225 of the target BS 220 transmits and receives a signal with a terminal which uses communication scheme of the target BS 220.

Figure 3:
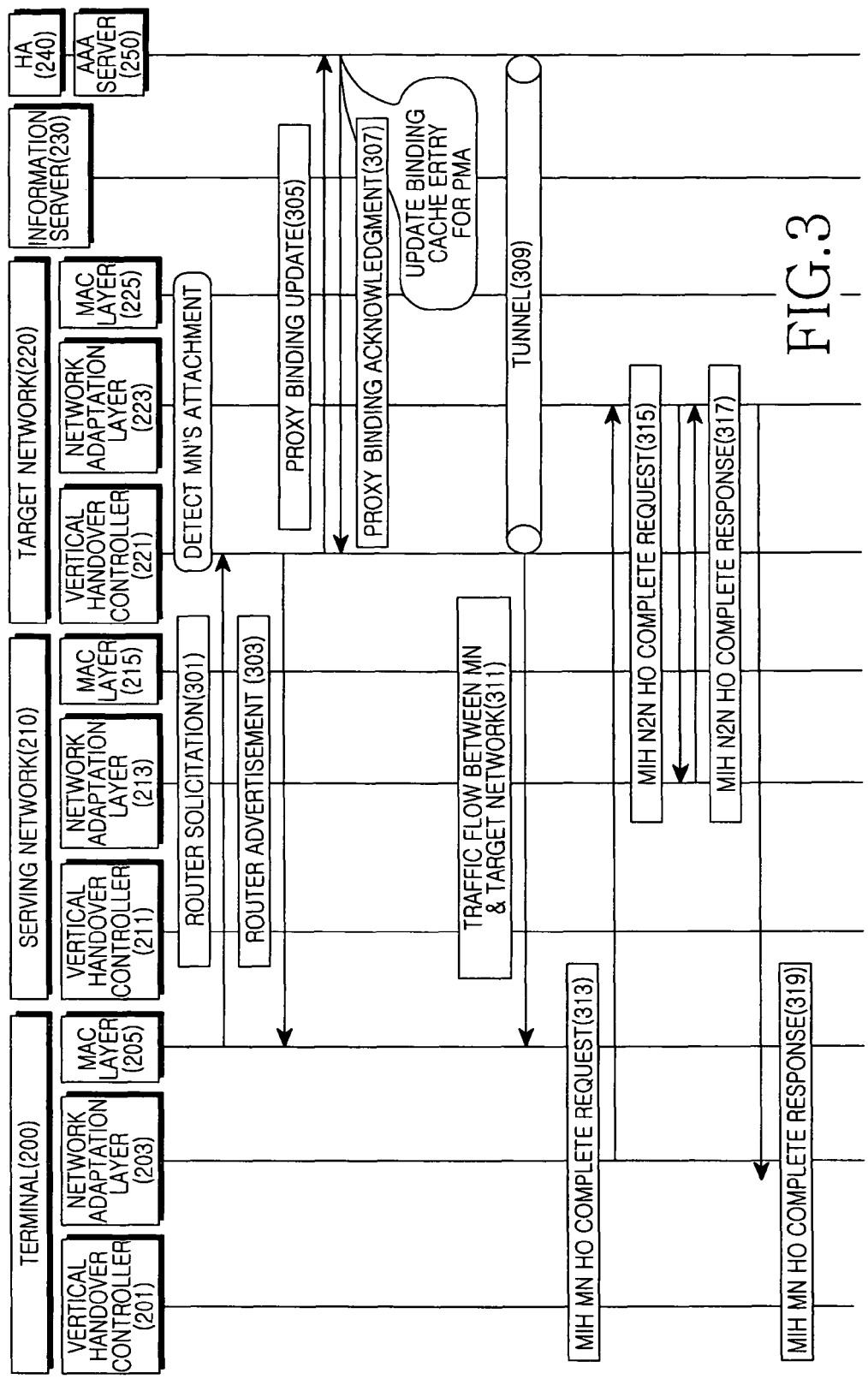
FIG. 3 is a diagram illustrating a signal flow for a procedure for performing a vertical handover to a target network in a wireless communication system according to an exemplary embodiment of the present invention.

With reference to FIG. 3, a procedure for a handover to the target network selected in the procedure of FIG. 2 will be described.

FIG. 3 is a diagram illustrating a signal flow for a procedure for performing a vertical handover to a target network in a wireless communication system according to an exemplary embodiment of the present invention.

Referring to FIG. 3, the terminal 200 transmits a Router Solicitation message to the target network 220 in order to connect to the target network 220 to which the serving network 210 has requested the terminal 200 to hand over to in step 301. The Router Solicitation message is transmitted to the target network 220 through a MAC layer 205 being a wireless interface for communicating with the target network 220.

Upon receipt of the Router Solicitation message, the target network 220 transmits a Router Advertisement message to the MAC layer 205 of the terminal 200 through the vertical handover controller 221 in step 303. That is, the Router Advertisement message includes router information with which the terminal 200 can connect to the target network 220.

Then the target network 220 transmits a Proxy Binding Update message including information about the current location of the terminal 200 to the AAA server 250 of the HA 240 through the vertical handover controller 221 in step 305.

When receiving the Proxy Binding Update message, the AAA server 250 updates the location information of the terminal 200, for a Per Mobile Node (MN) Address (PMA) and then transmits a Proxy Binding Acknowledgment message to the vertical handover controller 221 of the target network 220 in step 307.

In step 309, the target network 220 establishes a tunnel with the HA 240 through the vertical handover controller 221. Then the target network 220 receives data to be transmitted to the terminal 200 through the tunnel.

Upon receipt of data to be transmitted to the terminal 200, the target network 220 performs a traffic procedure with the terminal 200 in step 311.

In step 313, upon receipt of the data from the target network 220, the terminal 200 transmits an MIH MN HO Complete Request message to the target network 220 through the network adaptation layer 203.

Upon receipt of the MIH MN HO Complete Request message from the terminal 200 through the network adaptation layer 223, the target network 220 transmits an MIH N2N HO Complete Request message to the serving network 210 in step 315.

The serving network 210 then considers that the vertical handover of the terminal 200 has been completed. In step 317, the serving network 210 transmits an MIH N2N HO Complete Response message to the target network 220 through the network adaptation layer 213.

Upon receipt of the MIH N2N HO Complete Response message from the serving network 210 through the network adaptation layer 223, the target network 220 transmits an MIH MN HO Complete Response message to the terminal 200 in step 319.

A description will be made of a procedure for controlling a terminal-initiated handover in a wireless communication system with reference to FIG. 4.

Figure 4:
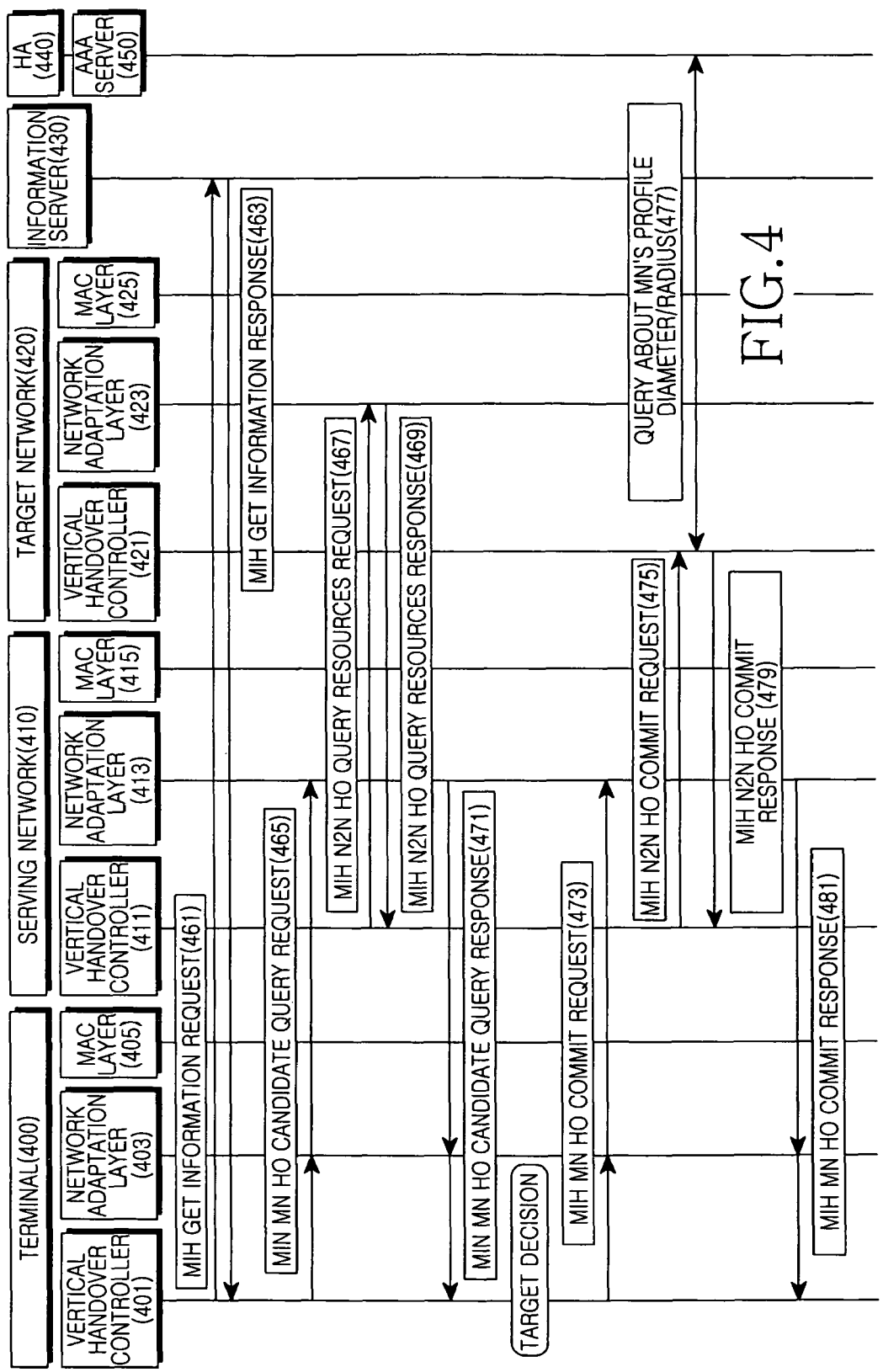
FIG. 4 is a diagram illustrating a signal flow for a procedure for selecting a target network for a vertical handover in a wireless communication system according to another exemplary embodiment of the present invention.

FIG. 4 is a diagram illustrating a signal flow for a procedure for selecting a target network for a vertical handover in a wireless communication system according to another exemplary embodiment of the present invention.

Referring to FIG. 4, a terminal 400 receives a service over a serving network 410. The terminal 400 acquires information about its neighbor networks from an information server 430 through a vertical handover controller 401 in steps 461 and 463. For instance, the vertical handover controller 401 of the terminal 400 transmits an MIH Get Information Request message to the information server 430 in order to acquire the neighbor network information in step 461. The information server 430 replies to the vertical handover controller 401 with an MIH Get Response message in step 463.

The vertical handover controller 401 of the terminal 400 selects candidate target networks based on the neighbor network information received from the information sever 430 and transmits information about the candidate target networks to a network adaptation layer 413 of the serving network 410 via a network adaptation layer 403 by an MIH MN HO Candidate Query Request message in step 465.

The serving network 410 checks the candidate target networks selected by the terminal 400. In step 467, the serving network 410 queries the candidate target networks whether they can support the vertical handover of the terminal 400 through the vertical handover controller 411. That is, the serving network 410 transmits MIH N2N HO Query Resources Request messages to the candidate target networks in order to determine whether they have resources to support the vertical handover of the terminal 400.

Upon receipt of the MIH N2N HO Query Resources Request messages, the candidate target networks determine whether they can provide a service to the terminal 400 after the vertical handover by checking their available resources.

The candidate target networks transmit MIH N2N HO Query Resources Response messages indicating whether they support the vertical handover to the serving network 410 in step 469.

The serving network 410 transmits information indicating whether the candidate target networks can support the vertical handover to the terminal 400 by an MIH MN HO Candidate Query Response message in step 471.

The vertical handover controller 401 of the terminal 400 selects a target network 420 for the vertical handover according to the received information.

Then the terminal 400 transmits an MIH MN HO Commit Request message including information about the target network 420 to the serving network 410 through the network adaptation layer 403 in step 473.

Upon receipt of the MIH MN HO Commit Request message through the network adaptation layer 413, the serving network 410 transmits an MIH N2N HO Commit Request message to the target network 420 through the vertical handover controller 411 in step 475.

Upon receipt of the MIH N2N HO Commit Request message, the target network 420 acquires a profile of the terminal 400 from an AAA server 450 of an HA 440 in step 477. The profile of the terminal 400 includes a home agent address of the terminal 400, a home prefix of the terminal 400, an addressing model, a permitted address configuration mechanism, and parameters required for emulating a home network of the terminal 400.

When acquiring the profile of the terminal 400 from the AAA server 450, the target network 420 transmits an MIH N2N HO Commit Response message to the serving network 410 through a vertical handover controller 421 in step 479.

Upon receipt of the MIH N2N HO Commit Response message from the target network 420 through the vertical handover controller 411, the serving network 410 transmits an MIH MN HO Commit Response message to the terminal 400 through the network adaptation layer 413 in step 481. Herein, a MAC layer 415 of the serving BS 410 transmits and receives a signal with a terminal which uses communication scheme of the serving BS 410. A MAC layer 425 of the target BS 420 transmits and receives a signal with a terminal which uses communication scheme of the target BS 420.

Figure 5:
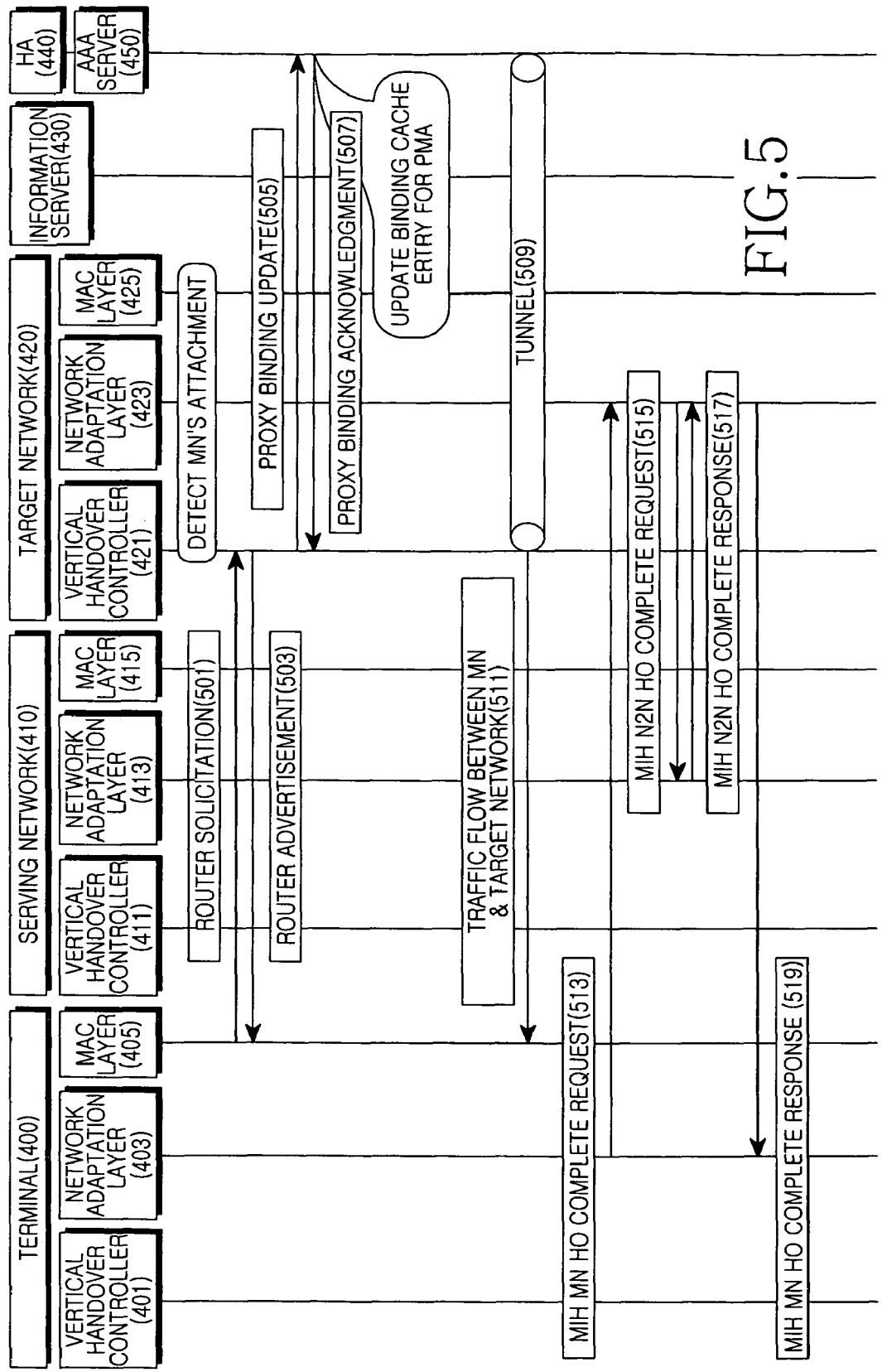
FIG. 5 is a diagram illustrating a signal flow for a procedure for performing a vertical handover to a target network in the wireless communication system according to another exemplary embodiment of the present invention.

With reference to FIG. 5, a procedure for a handover to the target network that the terminal selected in the procedure of FIG. 5 will be described.

FIG. 5 is a diagram illustrating a signal flow for a procedure for performing a vertical handover to a target network in the wireless communication system according to another exemplary embodiment of the present invention.

Referring to FIG. 5, the terminal 400 transmits a Router Solicitation message to the target network 420 in order to connect to the target network 420 selected according to the procedure of FIG. 4 in step 501. The Router Solicitation message is transmitted to the target network 420 through a MAC layer 405 being a wireless interface for communicating with the target network 420.

Upon receipt of the Router Solicitation message, the target network 420 transmits a Router Advertisement message to the MAC layer 405 of the terminal 400 through the vertical handover controller 421 in step 503. That is, the Router Advertisement message includes router information with which terminal 400 can connect to the target network 420.

Then the target network 420 transmits a Proxy Binding Update message including information about the current location of the terminal 400 to the AAA server 450 of the HA 440 through the vertical handover controller 421 in step 505.

Upon receiving the Proxy Binding Update message, the AAA server 450 updates the location information of the terminal 400, for a PMA and then transmits a Proxy Binding Acknowledgment message to the vertical handover controller 421 of the target network 420 in step 507.

In step 509, the target network 420 establishes a tunnel with the HA 440 through the vertical handover controller 421. Then the target network 420 receives data to be transmitted to the terminal 400 through the tunnel.

Upon receipt of data to be transmitted to the terminal 400, the target network 420 performs a traffic procedure with the terminal 400 in step 511.

In step 513, upon receipt of the data from the target network 420, the terminal 400 transmits an MIH MN HO Complete Request message to the target network 420 through the network adaptation layer 403.

Upon receipt of the MIH MN HO Complete Request message from the terminal 400 through the network adaptation layer 423, the target network 220 transmits an MIH N2N HO Complete Request message to the serving network 410 in step 515.

The serving network 410 then considers that the vertical handover of the terminal 400 has been completed. In step 517, the serving network 410 transmits an MIH N2N HO Complete Response message to the target network 420 through the network adaptation layer 413.

Upon receipt of the MIH N2N HO Complete Response message from the serving network 410 through the network adaptation layer 423, the target network 420 transmits an MIH MN HO Complete Response message to the terminal 400 in step 519.

As is apparent from the above description, the present invention advantageously enables a terminal to receive a service seamlessly even when it moves between heterogeneous networks by performing a vertical handover by Proxy Mobile IPv6-based MIH in a wireless communication supporting multiple networks.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A vertical handover method in a wireless communication system, comprising:
   selecting a target network for a vertical handover from among at least one candidate target network according to whether the at least one candidate target network supports the vertical handover and transmitting information about the selected target network to a serving network by a terminal;
   requesting the vertical handover of the terminal to the target network by the serving network;
   acquiring a profile of the terminal from a policy store by the target network, upon receipt of the vertical handover request from the serving network;
   requesting a connection to the target network by the terminal;
   transmitting information about a router to which the terminal will connect to the terminal by the target network, upon receiving the connection request from the terminal; and
   updating a proxy binding for the terminal in the policy store by the target network.

2. The vertical handover method of claim 1, further comprising:
   determining whether at least one candidate target network available to the terminal for the vertical handover supports the vertical handover by the serving network; and
   transmitting information indicating whether the at least one candidate target network supports the vertical handover to the terminal by the serving network,
   wherein the target network selection comprises selecting the target network based on the information received from the serving network by the terminal.

3. The vertical method of claim 2, further comprising:
   checking information about one or more neighbor networks of the terminal from an information server by the terminal; and
   selecting at least one candidate target network for the vertical handover according to the neighbor network information and transmitting information about the selected at least one candidate target network to the serving network by the terminal,
   wherein the determination comprises determining whether the selected at least one candidate target network supports the vertical handover of the terminal by the serving network.

4. The vertical handover method of claim 1, further comprising:
   transmitting a response signal for the vertical handover request to the serving network by the target network, after checking the profile of the terminal; and
   transmitting an information of the response signal to the terminal by the serving network, upon receipt of the response signal from the target network.

5. The vertical handover method of claim 1, wherein the policy store is an Authentication, Authorization and Accounting (AAA) server.

6. The vertical handover method of claim 1, wherein the profile of the terminal includes at least one of a home agent address of the terminal, a home prefix of the terminal, an addressing model, a permitted address configuration mechanism, and a parameter required for emulating a home network of the terminal.

7. The vertical handover method of claim 1, further comprising:
   establishing a tunnel with the policy store and receiving a traffic to be transmitted to the terminal through the tunnel by the target network, after the proxy binding update; and
   transmitting the received traffic to the terminal by the target network.

8. A wireless communication system for performing a vertical handover, comprising:
   a terminal for selecting a target network for a vertical handover from among at least one candidate target network according to whether the at least one candidate target network supports the vertical handover and transmitting information about the selected target network to the serving network;
   the serving network for requesting the vertical handover of the terminal to the target network, upon receipt of a handover request signal from the terminal; and
   the target network for acquiring a profile of the terminal from a policy store by the target network, upon receipt of the vertical handover request from the serving network, transmitting an information about a router to which the terminal will connect to the terminal, upon receipt of a connection request from the terminal, and updating a proxy binding for the terminal in the policy store.

9. The wireless communication system of claim 8, wherein the terminal selects at least one candidate target network for the vertical handover according to information about one or more neighbor networks of the terminal acquired from an information server and transmits information about the selected at least one candidate target network to the serving network, and the serving network determines whether the selected at least one candidate target network supports the vertical handover of the terminal and transmits information indicating whether the selected at least one candidate target network supports the vertical handover to the terminal.

10. The wireless communication system of claim 8, wherein the profile of the terminal includes at least one of a home agent address of the terminal, a home prefix of the terminal, an addressing model, a permitted address configuration mechanism, and a parameter required for emulating a home network of the terminal.

11. The wireless communication system of claim 8, wherein after the proxy binding update, the target network establishes a tunnel with the policy store, receives a traffic to be transmitted to the terminal through the tunnel, and transmits the received traffic to the terminal.

* * * * *